United States Patent
Gupta et al.

(10) Patent No.: US 9,020,194 B2
(45) Date of Patent: Apr. 28, 2015

(54) SYSTEMS AND METHODS FOR PERFORMING A DEVICE ACTION BASED ON A DETECTED GESTURE

(71) Applicant: QUALCOMM Incorporated, San Diego, CA (US)

(72) Inventors: Samir K. Gupta, San Diego, CA (US); Virginia Walker Keating, San Diego, CA (US); Evan R. Hildreth, Thornhill (CA)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 13/918,078

(22) Filed: Jun. 14, 2013

(65) Prior Publication Data

US 2014/0368422 A1     Dec. 18, 2014

(51) Int. Cl.
*G06K 9/00*     (2006.01)
*G06F 3/01*     (2006.01)
*G06F 3/03*     (2006.01)

(52) U.S. Cl.
CPC .............. *G06F 3/017* (2013.01); *G06F 3/0304* (2013.01)

(58) Field of Classification Search
None
See application file for complete search history.

(56) References Cited

U.S. PATENT DOCUMENTS

| | | | |
|---|---|---|---|
| 7,129,927 B2 | 10/2006 | Mattsson | |
| 7,176,888 B2 | 2/2007 | Marvit et al. | |
| 2005/0232467 A1* | 10/2005 | Mohri et al. | 382/103 |
| 2008/0192005 A1 | 8/2008 | Elgoyhen et al. | |
| 2012/0254809 A1 | 10/2012 | Yang et al. | |
| 2012/0262372 A1 | 10/2012 | Kim et al. | |
| 2012/0272194 A1 | 10/2012 | Yang et al. | |

FOREIGN PATENT DOCUMENTS

EP     0587138 A2     3/1994

OTHER PUBLICATIONS

Wobbrock, Jacob O., Andrew D. Wilson, and Yang Li. "Gestures without libraries, toolkits or training: a $1 recognizer for user interface prototypes." Proceedings of the 20th annual ACM symposium on User interface software and technology. ACM, 2007.*
International Search Report and Written Opinion—PCT/US2014/042419—ISA/EPO—Sep. 18, 2014.

* cited by examiner

*Primary Examiner* — Nirav G Patel

(74) *Attorney, Agent, or Firm* — Kilpatrick Townsend & Stockton LLP

(57) ABSTRACT

Systems and methods for performing an action based on a detected gesture are provided. The systems and methods provided herein may detect a direction of an initial touchless gesture and process subsequent touchless gestures based on the direction of the initial touchless gesture. The systems and methods may translate a coordinate system related to a user device and a gesture library based on the detected direction such that subsequent touchless gestures may be processed based on the detected direction. The systems and methods may allow a user to make a touchless gesture over a device to interact with the device independent of the orientation of the device since the direction of the initial gesture can set the coordinate system or context for subsequent gesture detection.

29 Claims, 10 Drawing Sheets

US 9,020,194 B2

SYSTEMS AND METHODS FOR PERFORMING A DEVICE ACTION BASED ON A DETECTED GESTURE

TECHNICAL FIELD

Embodiments disclosed herein are generally directed to systems and methods for performing a device action based on a detected gesture. In particular, embodiments disclosed herein may allow a user to perform an action with a gesture independent of an orientation of the device.

BACKGROUND

Electronic devices are becoming increasingly more advanced. Many devices now include various cameras or other sensors that can be used not only to detect information about the device, but can be used to instruct the device to perform functions. For example, some devices are now capable of detecting and processing gestures for executing commands. There is a need for improved systems and methods for performing a device action based on a detected gesture.

SUMMARY

Consistent with some embodiments, there is provided a device for performing an action. The device includes a gesture detection sensor configured to detect movement of a control object moving over the device and capture information related to the detected movement, and detect a touchless gesture performed over the device and capture information related to the touchless gesture. The device also includes one or more processors configured to determine a direction of motion of the control object from the captured information related to the detected movement, and perform an action based on the captured information related to the information related to the touchless gesture and the determined direction of motion.

Consistent with some embodiments, there is also provided a method for performing an action. The method includes detecting motion of a control object moving over the device, determining a direction of movement of the control object, detecting a touchless gesture performed over the device, and performing an action based on the detected touchless gesture and the determined direction of motion. The provided method may also be embodied as instructions on a computer-readable medium.

Consistent with some embodiments, there is also provided a method for performing an action based on a detected touchless gesture. The method includes detecting a first gesture passing over the device, determining if the detected first gesture matches a known gesture in a gesture library or an expected gesture, translating a coordinate system associated with the device based on the determined direction of the detected first gesture when the detected first gesture does not match a known gesture in a gesture library or an expected gesture, and performing an action based on a second detected gesture when the second detected gesture is determined to match a known gesture in a gesture library or an expected gesture that has been translated based on the translated coordinate system.

Consistent with some embodiments, there is also provided a system for performing an action. The system includes means for detecting movement of a control object moving over a device, means for determining a direction of movement of the control object, means for detecting a touchless gesture performed over the device, means for performing an action based on the detected touchless gesture and the determined direction of movement.

Consistent with some embodiments, there is further provided a method including detecting a first touchless gesture performed near a device, determining a coordinate system for gesture interpretation based on the first touchless gesture, detecting a second touchless gesture performed subsequent to the first touchless gesture, and executing a command on the device based on the second touchless gesture and the determined coordinate system. In some embodiments, determining the coordinate system may include determining at least one of an alignment and an orientation of the coordinate system. Detecting a first touchless gesture may include detecting a swipe over the device, and wherein determining the coordinate system may include setting the coordinate system so as to align with a direction of the swipe. Detecting a first touchless gesture may include detecting a hand pose over the device, and wherein determining the coordinate system may include setting the coordinate system so as to align with an orientation of the detected hand pose. The determined coordinate system may be oriented differently than the coordinate system was oriented prior to detecting the first touchless gesture. Detecting the first touchless gesture may include detecting movement in a substantially circular shape or portion thereof.

The method may also include detecting a third touchless gesture, the third touchless gesture being a gesture for resetting the coordinate system, detecting a fourth touchless gesture, and determining a coordinate system for gesture interpretation based on the fourth touchless gesture. Detecting a fourth touchless gesture may include detecting at least one of a swipe over the device and a hand pose over the device, and wherein determining the coordinate system may include setting the coordinate system so as to align with at least one of a direction of the swipe and an orientation of the hand pose. Detecting a third touchless gesture may include detecting the third touchless gesture prior to detecting the first touchless gesture.

Figure 1:
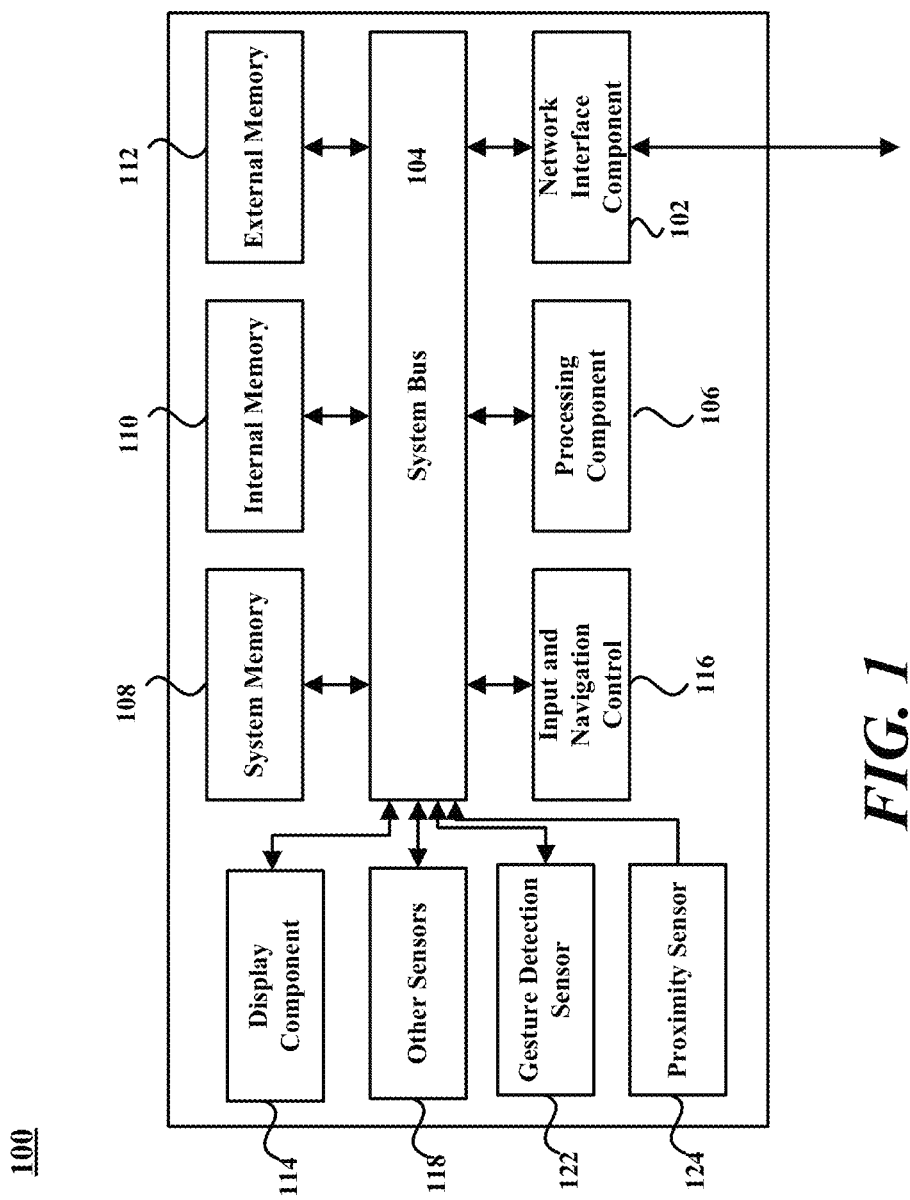
FIG. 1 is a diagram illustrating a processing device 100, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Gestures may be useful, for example, in hands-free or eyes-free situations. In such situations, a user may not be looking directly at the device or even holding the device, and is using the gesture in lieu of actually looking at the device or picking up the device. Moreover, because the user may not be looking at the device or holding the device, the user may not know what orientation the device is at and, if the gesture is direction-dependent, for example a left-to-right swipe, it may be difficult to complete if the orientation is not known because the device may not recognize a gesture that the user thinks is going from left-to-right, but, due to the orientation of the device, is actually going up-to down. Accordingly, there is a need for systems and methods that are capable of performing device actions based on gestures that are independent of the orientation of the device FIG. 1 is a diagram illustrating a processing device 100, consistent with some embodiments. Processing device 100 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™ or a mobile device which does not implement an operating system. Processing device 100 may also be a tablet computer, such as an iPad™ or other tablet computer running one of the aforementioned operating systems. Processing device 100 may also be PCs or laptops or netbooks, a set-top boxes (STB) such as provided by cable or satellite content providers, or a video game system consoles such as the Nintendo® Wii™, the Microsoft® Xbox 360™, or the Sony® PlayStation™ 3, or other video game system consoles. Processing device 100 may be head-mounted display (HMD) or other wearable computing device. In some embodiments, processing device 100 is implemented in an automobile, for example in an entertainment center or console of an automobile, or is included or implemented in a healthcare device. According to some embodiments, processing device 100 may be implemented using any appropriate combination of hardware and/or software configured for detecting a gesture and performing an action based, in part, on the detected gesture. In particular, processing device 100 may include any appropriate combination of hardware and/or software having one or more processors and capable of reading instructions stored on a non-transitory machine-readable medium for execution by the one or more processors for detecting a gesture and performing an action based, in part, on the detected gesture. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read.

Processing device 100 may include network interface component 102 configured for communication with a network. Consistent with some embodiments, network interface component 102 may be configured to interface with a coaxial cable, a fiber optic cable, a digital subscriber line (DSL) modem, a public switched telephone network (PSTN) modem, an Ethernet device, and/or various other types of wired network communication devices. Network interface component 102 may also include one or more wireless transceivers, wherein each wireless transceiver may include an antenna that is separable or integral and is capable of transmitting and receiving information according to a different wireless networking protocol, such as Wi-Fi™, 3G, 4G, HSDPA, LTE, RF, NFC. Consistent with some embodiments, processing device 100 includes a system bus 104 for interconnecting various components within processing device 100 and communication information between the various components. In some embodiments, the bus 104 is implemented in a System on Chip (SoC) and connects various elements or components on the chip and/or cores of one or more processors. Components may include a processing component 106, which may be one or more processors, central processing units (CPUs), image signal processors (ISPs), micro-controllers, or digital signal processors (DSPs), graphics processing units (GPUs), and audio signal processors, which may include analog and/or digital audio signal processors. Components may also include a system memory component 108, which may correspond to random access memory (RAM), an internal memory component 110, which may correspond to read only memory (ROM), and an external or static memory 112, which may correspond to optical, magnetic, or solid-state memories. Consistent with some embodiments, processing device 100 may also include a display component 114 for displaying information to a user. Display component 114 may be a liquid crystal display (LCD) screen, an organic light emitting diode (OLED) screen (including active matrix AMOLED screens), an LED screen, a plasma display, or a cathode ray tube (CRT) display. Display component 114 may be integrated with processing device 100, or may be separate from processing device 100 and coupled to processing device 100. Processing device 100 may also include an input and navigation control component 116, allowing for a user to input information and navigate along display component 114. An input and navigation control component 116 may include, for example, a keyboard or key pad, whether physical or virtual, a mouse, a trackball, or other such device, or a touch sensing screen, for example a capacitive sensor-based touch-screen, a screen having photodetectors dispersed throughout or along the edges thereof to detect nearby objects, and/or a screen having ultrasonic sensing capabilities.

Processing device 100 may include more or less components than shown in FIG. 1 according to some embodiments. For example, processing device 100 may include any one or two of system memory component 108, internal memory component 110, and external memory component 112. Moreover, components shown in FIG. 1 may be directly coupled to one or more other components in FIG. 1, eliminating a need for system bus 104. In general, the components shown in FIG. 1 are shown as examples of components in a processing device 100 capable of performing embodiments disclosed herein. However, a processing device 100 may have more or fewer components and still be capable of performing some embodiments disclosed herein.

Processing device 100 may also include other sensors 118 that capture data associated with device 100 and/or its surroundings. Sensors 118 may include, but are not limited to, microphones or audio sensors, cameras, light sensors, proximity sensors, pressure sensors, magnetometers, etc. Sensors 118 may be used individually or in combinations, such as sensor arrays or any other combinations. Sensors 118 may be capable of operating interdependently or independently of one another.

Sensors 118 may also include inertial sensors such as accelerometers and/or gyroscopes. An accelerometer may detect acceleration of processing device 100, and a gyroscope may detect an orientation of device 100. According to some embodiments, acceleration detected by an accelerometer may be indicative of movement or motion of processing device 100 and/or a change in orientation of processing device 100. For example, a detected acceleration may be indicative of a user picking up or moving processing device 100. Similarly, a change in orientation of device 100 detected by a gyroscope may also be indicative of a user picking up or moving processing device 100. In some embodiments, sensors 118 may detect information about device 100 and send the information to processing component 106 for processing the information according to instructions stored in any of memories 108-112. Based on the provided information, processing component 106 may determine if device is or has been in motion, has been moved, or is in a different orientation.

Processing device 100 may also include a gesture detection sensor 122. Gesture detection sensor 122 may be any sensor capable of detecting a gesture made by a user. According to some embodiments, gesture detection sensor 122 may be a camera, an ultrasound transducer, a light pipe shadow detector, a microelectromechanical systems (MEMS) device, an infrared sensor, one or more optical near-field sensors and/or sensors configured for computational imaging, and/or an ambient light sensor, or other sensor configured to detect gestures. In some embodiments, a gesture may be a touchless gesture or interaction that may be detected by gesture detection sensor 122, where the gesture made by a user may be detected without a user having to touch gesture detection sensor 122. Examples of a touchless gesture may include a hand cover gesture, where a hand of a user covers gesture detection sensor 122, or a "swipe" gesture whereby a hand passes over gesture detection sensor 122 in proximity to gesture detection sensor 122. In some embodiments, "over" gesture detection sensor 122 may refer to a hand or control object or other object that passes within a detection field of gesture detection sensor 122. That is, a hand or other object may be considered to be passing over gesture detection sensor 122 if it is moving in an area where it can be detected by gesture detection sensor 122, for example regardless of whether the gesture is on the same side of the device as a screen of the device or vertically spaced above the device with respect to the earth's surface in some embodiments.

A touchless gesture may also be made by a control object in lieu of a hand of a user. In some embodiments, gesture detection sensor 122 may include a microphone that is sensitive to ultrasonic frequencies. Gesture detection sensor 122 may also include an ultrasound transducer that emits ultrasound waves that are used to track the position of a control object, wherein a touchless gesture may be determined by monitoring the position of the control object over time. For embodiments that use a camera to detect a gesture, the camera may be a visible light camera or a depth-sensing camera, such as the Microsoft® Xbox™ Kinect™ camera. The camera may also be configured to detect infrared (IR) light or ultraviolet (UV) light. Gesture detection sensor 122 may also be a stereo camera, a time-of-flight (ToF) camera, or other camera capable of detecting a gesture made by a user. Gesture detection sensor 122 may also be a Nintendo® Wii™ WiiMote™, or Sony® PlayStation™ Move™ in some embodiments. In some embodiments, gesture detection sensor 122 may include one or more gesture detection sensors, such as described above, working in combination to detect gestures made by a user.

In some embodiments, a gesture detection process may be implemented by processing component 106 based on instructions stored in memories 108-112 working in combination with gesture detection sensor 122. The gesture detection process may detect gestures by processing a series of images or other information captured by gesture detection sensor 122 to detect an abrupt change in an image statistic. Although embodiments disclosed herein are described as being performed by processing component 106 based on instructions included in any of memories 108-122, in some embodiments gesture detection sensor 122 may include a memory and one or more processors that may be capable of processing images that it captures by gesture detection sensor 122.

In operation, processing component 106 may calculate an image statistic for each captured image. An image statistic may be a histogram, average luminance, variance of luminance, etc. Processing component 106 may then compare a current image statistic with a prior image statistic, wherein a prior image statistic may be calculated as a combination of the image statistics of a set of one or more captured images acquired at times immediately preceding the current captured image. In some embodiments, processing component 106 may compare image statistics by calculating the absolute difference, sum of absolute differences of each of a set of statistics, or sum of absolute differences of each bin of a histogram, the result of which may be compared to a threshold to exclude differences resulting from ambient lighting or device motion. Differences greater than the threshold may be classified as abrupt changes in an image statistic indicative of a gesture that occludes gesture detection sensor 122. This is just one method of detecting a gesture using gesture detection sensor 122 alone or in combination with processing component 106. In some embodiments, gesture detection sensor 122 may be an ultrasound gesture detection sensor wherein an ultrasound wave is emitted from processing device 100 to track a position of a control object, and the position of the control object over time may be monitored to detect a gesture.

Processing device 100 may also include a proximity sensor 124. Proximity sensor 124 may be configured to detect when an object comes in proximity with device 100. According to some embodiments, the object may be a control object that may correspond to a hand of a user, a stylus held by the user, or other device that the user can pass over device 100, e.g., such that it can be detected by gesture detection sensor 122. Moreover, proximity sensor 124 may be configured to detect when an object comes within about 20-50 cm of device 100. Consistent with some embodiments, proximity sensor 124 may be one or more ultrasonic proximity sensors. Proximity sensor 124 may also include one or more heat sensors, such as an infrared heat sensor that detects the heat produced by an object when the object is in proximity of the device. Proximity sensor 124 may also include one or more electric field proximity sensors that may detect the presence of a conducting or partially conducting object as the object enters an electric field created by electrodes on or otherwise associated with the sensor. Proximity sensor 124 may also include an ambient light sensor that may detect a presence of an object by the object causing the ambient light to decrease as a result of occlusion of light by the object.

Proximity sensor 124 and gesture detection sensor 122 are shown in FIG. 1 as separate components of processing device 100. However, a single component may be capable of detecting proximity and a gesture. In some embodiments, proximity sensor 124 may be integrated in gesture detection sensor 122 as a component of gesture detection sensor 122. That is, the same device that is capable of detecting a gesture may also be capable of detecting proximity. Similarly, gesture detection sensor 122 may be integrated in proximity sensor 124 as a component of proximity sensor 124 such that the same device capable of detecting proximity may also be capable of detecting a gesture.

According to some embodiments, gesture detection sensor 122 may be inactive until processing component 106 generates a prompt or alert to which a gesture may be used to perform an action in response to the prompt or alert. Alternatively, gesture detection sensor 122 may be inactive until proximity sensor 124 detects an object in proximity of device 100. In some embodiments, the object may be a control object such as a user's hand. Further, gesture detection sensor 122 may be configured to capture frames of data, including image data, that may be analyzed by processing component 106 for the presence, absence, and direction of a gesture. In some embodiments, gesture detection sensor 122 may be configured to capture a predetermined number of frames per second that may be increased or decreased based on such factors as desired detection accuracy and power conservation. For example, capturing more frames per second may provide greater accuracy, while draining power more quickly, while capturing less frames per second may provide less accuracy, but will drain power less quickly. Further, processing component 106 may be configured analyze the frames at a variable rate that may be increased in order to improve accuracy at the expense of power, but may be decreased in order to improve power conservation at the expense of accuracy. In some embodiments, processing component 106 may be configured to look for gestures in one out of every eight frames to conserve power, but this rate may be increased or decreased to improve accuracy or power conservation. Moreover, the frames may be stored in a buffer in gesture detection sensor 122 or in any of memories 108-112 and may be accessed for greater accuracy in gesture detection if needed. That is, if processing component 106 is configured to analyze only one out of every eight frames, the other seven frames may be stored in a buffer or memory and accessed by processing component 106 for greater accuracy to determine the presence and direction of a gesture or for resolving a possible or partial detected gesture.

According to some embodiments, gesture detection sensor 122 may be configured to detect a gesture made by a user to perform an action or execute a command associated with the gesture. For example a user may perform a touchless gesture that is detected by gesture detection sensor 122 and compared to known touchless gestures in a gesture table or an expected touchless gesture by processing component 106 to match an action or command with the detected touchless gesture. In some embodiments, a gesture table may include known gestures and a corresponding command or action with the gestures. The known gestures in the gesture table may be defined by an application developer, a device manufacturer, a user, or they may be defined by an operating system. In some embodiments, an expected gesture is a gesture that processing component 106 expects to detect. For example, if processing component 106 generates a prompt that requires input from a user to perform an action, processing component 106 may define a certain gesture that, when recognized, will cause the action to be performed. One example may be an alert that requires a user to make a side-to-side touchless gesture over device 100. Processing component 106 may expect that gesture to be performed in order to perform an action, and if that gesture is not performed, processing component 106 may not take any action.

Figure 2:
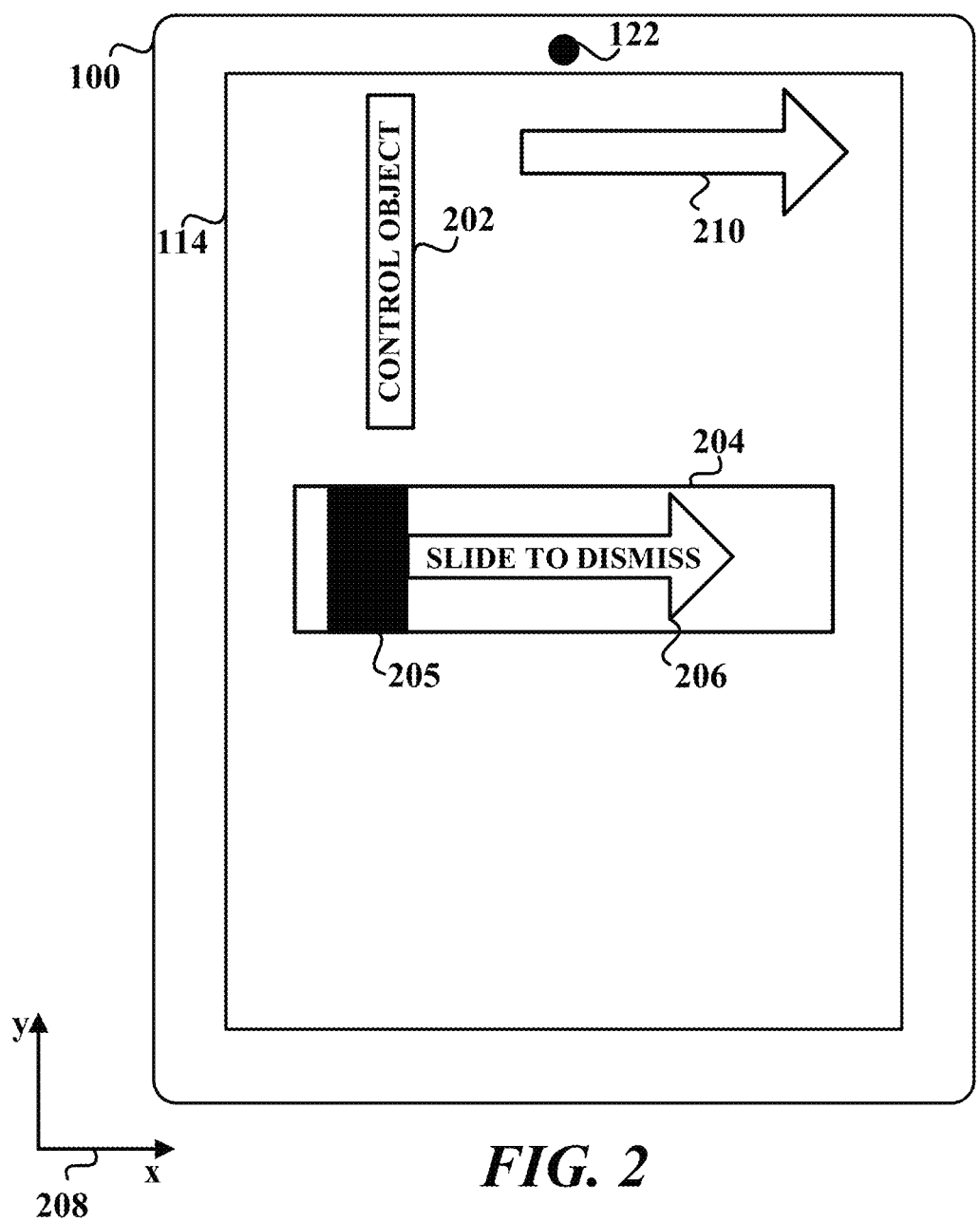
FIG. 2 is a diagram illustrating an example of interacting with a computing device using a touchless gesture, consistent with some embodiments.

FIG. 2 is a diagram illustrating an example of interacting with a computing device using a touchless gesture, consistent with some embodiments. As shown in FIG. 2, gesture detection sensor 122 may be configured to detect a touchless gesture made by a control object 202 passing over device 100 and/or gesture detection sensor 122. As described above, over device 100 and gesture detection sensor 122 may refer to within a detection field of gesture detection sensor 122 regardless of device, sensor, and/or control object orientation in some embodiments. For example, in some embodiments, over device 100 may be on an opposite side of device 100 from a surface of Earth, regardless of device orientation. In some such embodiments, the user may perform the touchless gesture above the device even if a screen of the device is facing downward (for example, when screen down on a desk or table, such that the gesture is nearer to a back of the device than the screen) if the device can detect such touchless gesture, for example using ultrasound or a rear-facing camera. In some embodiments, over device 100 may be a plane that is approximately parallel to device 100. In some embodiments, the gesture made by control object 202 may be a movement or gesture made in response to an alert or prompt 204 generated by processing component 106 for display on display component 114. Moreover, alert or prompt 204 may provide a direction 206 of an expected gesture in some embodiments that may be used to perform an action associated with the alert or prompt 204. For example, as shown in FIG. 2, a user is expected to slide bar 205 in direction 206 to dismiss alert or prompt 204. Moreover, processing component may be configured to recognize a left-to-right swipe touchless gesture in direction 206 as effectively sliding bar 205 in direction 206 to dismiss alert or prompt 204.

Computing device 100 may define a Cartesian coordinate system 208 that corresponds to a length and width of device 100. In some embodiments, processing component 106 may be configured to compare a touchless gesture detected by gesture detection sensor 122 to a plurality of predefined known touchless gestures in a gesture table stored in memories 108-112, or an expected touchless gesture, to attempt to find a known touchless gesture matching the detected touchless gesture in order to facilitate recognition of the detected touchless gesture. In some embodiments, the predefined known touchless gestures in a gesture table and an expected touchless gesture are defined with respect to coordinate system 208. In some embodiments, the predefined known touchless gestures in a gesture table and/or an expected touchless gesture are two-dimensional gestures, such that gesture detection sensor captures information about the two-dimensional movement of a control object in a plane parallel to device 100.

As shown in FIG. 2, alert or prompt 204 generated by processing component 106 may prompt or request a certain behavior or conduct of the user, such as sliding bar 205 in direction 206 to dismiss the prompt. In some embodiments, gesture detection sensor 122 may be configured to detect a touchless gesture and processing component 106 may be configured to compare the detected touchless gesture to a known or expected touchless gesture that may be used to interact with alert or prompt 204. For example, a touchless gesture detected by gesture detection sensor 122 that is determined by processing component 106 to approximately correspond to the movement required to interact with alert or prompt 204 may be used to interact with alert or prompt 204. If gesture detection sensor 122 detects a touchless gesture with control object 202 in direction 210, processing component 106 may determine that the touchless gesture in direction 210 approximately corresponds to a known or expected touchless gesture for interacting with alert or prompt 204, such that alert or prompt 204 may be dismissed.

However, in some situations, computing device 100 may be laying on a surface, such as a desk or table, at an orientation that is that is unknown to the user and/or possibly askew from the user. Since the orientation of computing device 100 may define a coordinate system 208 for which processing component 106 attempts to match a performed touchless gesture to a known touchless gesture in a gesture table or an expected touchless gesture, for example, a user may have difficulties in successfully performing a touchless gesture, for example due to an orientation of the device or without inspecting device 100 to first determine the orientation and then performing the touchless gesture to match coordinate system 208 determined by the orientation.

Figure 3A:
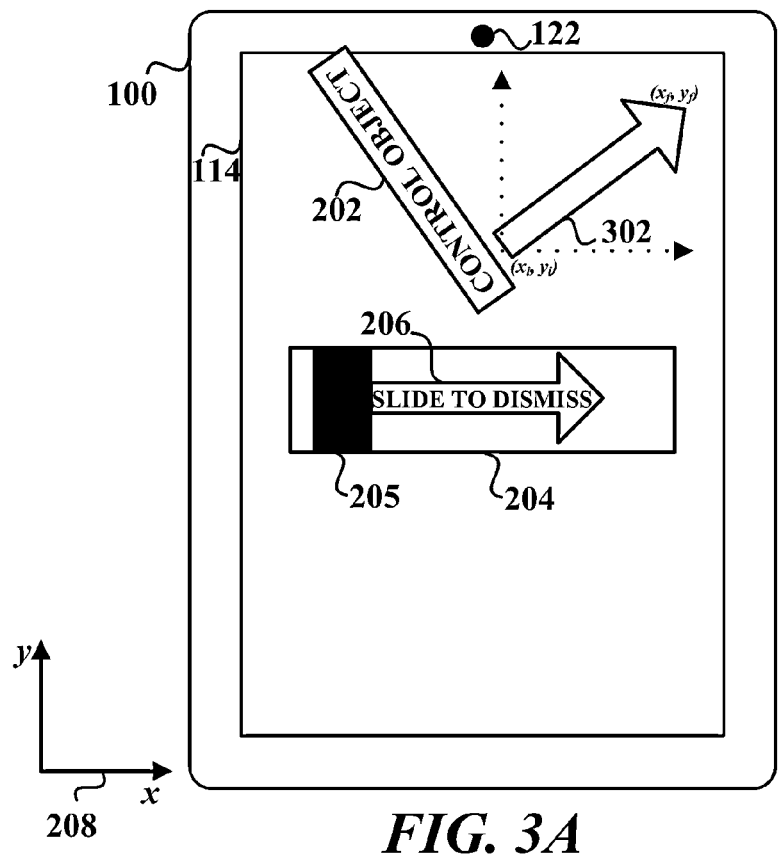
FIGS. 3A and 3B are diagrams illustrating translating a coordinates system associated with a device, consistent with some embodiments.

For example, as shown in FIG. 3A, control object 202 may be passed over computing device 100 in a direction 302. Gesture detection sensor 122 may sense the movement in direction 302 and processing component 106 may determine direction 302 of control object 202 and determine if the movement or gesture corresponds to a known touchless gesture in a gesture table, or an expected touchless gesture. In some embodiments, processing component 106 may determine a direction of the touchless gesture made by control object 202 based on a path from an initial gesture point $(x_i, y_i)$ to a final gesture point $(x_f, y_f)$. In some embodiments, direction 302 of the touchless gesture made by control object 202 may be determined by detecting the motion in a series of consecutive images captured by gesture detection sensor 122 to, for example, determine path from an initial gesture point $(x_i, y_i)$ to a final gesture point $(x_f, y_f)$ indicative of the direction of the gesture. Processing component 106 may divide each captured image into a set of sub-regions, and calculate a region statistic for each sub-region to form a set of region statistics. In some embodiments, sub-regions may include columns of an image, rows of an image, or grid segments of an image. A region statistic may be a histogram, average luminance, variance of luminance, etc similar to an image statistic. In some embodiments, processing component 106 may determine a displacement that results in a minimal difference in statistics. For each displacement of a set of displacements, a sum of absolute differences may be calculated between image statistics of regions of a current image and corresponding statistics of displaced regions of a prior image, and the displacement of minimum absolute difference is selected. A direction and velocity may then be calculated based on the selected displacement. In some embodiments, processing component 106 may detect an abrupt change in a region statistic, and compare the time of each region's abrupt change to determine a direction and velocity. This is just one method of detecting a direction of a gesture using gesture detection sensor 122 alone or in combination with processing component 106. In some embodiments, gesture detection sensor 122 may be an ultrasound gesture detection sensor wherein an ultrasound wave is emitted from processing device 100 to track a position of a control object, and the position of the control object over time may be monitored to detect a direction of a gesture.

In addition to the process described above, direction 302 of the touchless gesture made by control object 202 may be determined by other methods. For example, processing component 106 may expect a gesture in a certain direction, such as a right swipe, to dismiss alert or prompt 204 and assume that the direction of the detected touchless gesture was performed in the general direction of the expected direction. Thus, regardless of which direction the touchless gesture was detected in, the device may assume that the detect gesture was performed as a right swipe with respect to the user. The assumed direction may be set or configured in any number of ways. For example it may be pre-set, a user setting, and/or dependent on an active application. In some embodiments, a detected swipe may be used to distinguish between horizontal inputs and vertical inputs, for example, and it may not be determined whether the swipe was a left swipe or a right swipe. In some embodiments, features of control object 202 may be processed by processing component 106 to determine an orientation of control object 202 and the orientation may be used to determine direction 302. For example, images or ultrasound data can be used to determine if the control object is a hand and to determine the orientation of the hand (e.g., by matching the hand with a model, determining a skeleton of the hand, and/or detecting fingers in relation to a palm).

Returning to FIG. 3A, the determined direction 302 may not match direction 206 required for dismissing alert or prompt 204, and processing component 106 therefore may not recognize the movement made by control object 202 in direction 302 as a touchless gesture corresponding to the expected touchless gesture for dismissing alert or prompt 204 or a known touchless gesture in a gesture table that corresponds to dismissing. In some embodiments, the movement made by control object 202 in direction 302 may be recognized by processing component 106 as corresponding to a different known touchless gesture in gesture library, and may perform an action according to the matching known touchless gesture. However, if the performed action does not dismiss alert or prompt 204, the user may have to make another gesture to attempt to dismiss alert or prompt 204, and possibly even cancel the performed action in some systems.

Figure 3B:
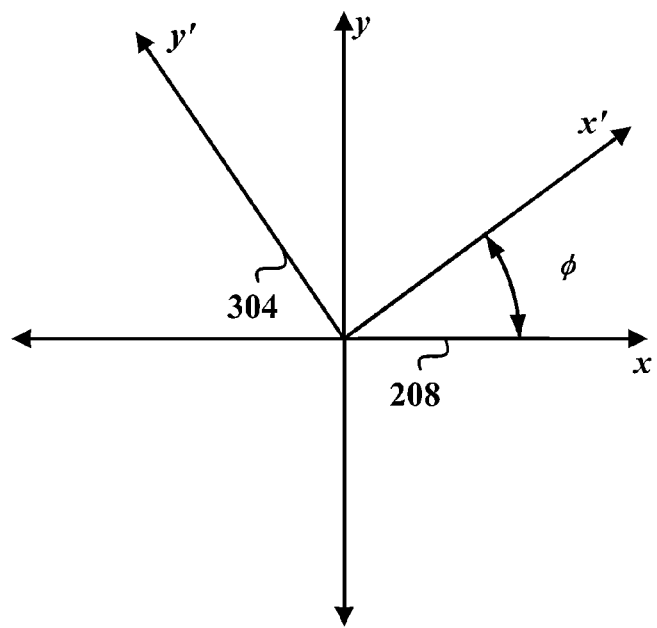

Consistent with some embodiments herein, however, processing component 106 may determine direction 302 of movement made by control object 202 based on a path from an initial gesture point $(x_i, y_i)$ to a final gesture point $(x_f, y_f)$ and translate coordinate system 208 to a new Cartesian coordinate system of x', y' based on direction 302. As shown in FIG. 3B, the new Cartesian coordinate system 304 of x', y' has been translated from coordinate system 208 by an azimuth φ from the x-axis of coordinate system 208 based on direction 302. Pursuant to embodiments herein, a linear, rotational, and/or other translation may be performed in some embodiments. Processing component 106 may then translate the predefined known touchless gestures in a gesture table or an expected touchless gesture to be defined with respect to new coordinate system 304.

In some embodiments, processing component 106 may be configured to translate coordinate system 208 to coordinate system 304 based on a setting of an application, or a setting in an operating system of device 100. For example, the application or software that, when executed, causes processing component to generate alert or prompt 204 may have a setting or feature that translates coordinate system 208 to coordinate system 304 based on a first detected gesture, or a detected gesture that does not match the expected gesture or a gesture stored in a gesture lookup table. In some embodiments, alert or prompt 204 may allow for coordinate system translation, while other alerts, prompts, or other content displayed on display component 114 does not allow for coordinate system translation. In some embodiments, an initial gesture, which may be a hand pose or movement of control object 202 in a different direction, may be a gesture that is interpreted as initiating or allowing coordinate system translation. Moreover, if control object 202 is a hand, a certain hand pose may be detected as movement of control object 202 is detected, and the hand pose may be correlated as a command for initiating a coordinate system translation based on the direction of movement 302.

After coordinate system 208 has been translated to coordinate system 304, one or more subsequent touchless gestures made by a user may then be matched by processing component 106 to a known touchless gesture or an expected touchless gesture that is defined according to new coordinate system 304. Processing component 106 may be configured to generate an indication or representation that processing component is processing gestures in new coordinate system 304 for display by display component 114. In some embodiments, processing component 106 may continue to process subsequent touchless gestures by matching to known touchless gestures in a gesture library or an expected touchless gesture translated to the new coordinate system 304 until a reset condition is satisfied. Translating the coordinate system and/or detected a subsequent gesture may comprise performing any of the translations described above on the coordinate system, performing any such translations on subsequently detected gestures, using a set of gestures known to have approximately such rotation or orientation, and/or translating a set of models. For example, the coordinate system may be translated as described above. As another example, the detected gestures could also be translated to the original or default coordinate system using the direction 302. Further, in some embodiments, there may be a different set of gestures against which to match based on the direction 302. In some embodiments, a lookup table may be used to select how different gestures will look at different angles/directions based on the direction 302. In some embodiments, a model for recognizing a gesture may be rotated or otherwise adjusted or a different model may be used based on the direction 302. In embodiments using a histogram as described herein, a different pattern may be identified based on the direction 302 or the pattern may be translated. The approaches described herein of "translating" the coordinate system and/or detecting gestures according to a translated coordinate system are not exhaustive, and other approaches may be used or practiced.

A reset condition may be a condition that, when met, resets the translated coordinate system back to the original coordinate system by transforming the new coordinate system 304 back to original coordinate system 208. A reset condition may include gesture detection sensor 122 not detecting a second or subsequent gesture within a predetermined time t and/or detecting movement or a gesture that does not correspond to a recognized or expected gesture within the time t or another predetermined time. A reset condition may include sensors 118 detecting a movement of device 100 that may be indicative of an orientation of device 100 being changed or a user picking up device 100. A reset condition may include a user manually translating the new coordinate system 304 to the original coordinate system 208 by pressing a button on device 100, or changing a setting in device 100. In some embodiments, a reset condition includes a specific gesture or a set of gestures, such as described further in FIGS. 6A and 6B. In some embodiments, a reset condition or reset gesture may translate new coordinate system 304 to a different coordinate system. For example, coordinate system 208 may not be a "normal" coordinate system of device 100, and the reset condition or gesture may translate new coordinate system 304 to a "normal" coordinate system of device 100. In some embodiments, certain conditions or gestures may be used to set a different coordinate system, similar to how detecting an initial gesture made by control object 202 sets coordinate system 208 to coordinate system 304.

Although FIGS. 3A and 3B have been described as interpreting a gesture based on a translated coordinate system, the coordinate system need not necessarily be translated, in some embodiments, in order to perform an action by making a gesture that may not match a direction of an expected gesture. For example, a gesture lookup table stored in any of memories 108-112 may have gestures corresponding to a gesture made at numerous orientations, where each orientation of the same gesture may be correlated to the same action or command. This is further described in FIG. 5, below. Alternatively, processing component 106 may use one or more models for matching or detecting a gesture and associating the detected gesture with a command or action. These one or more models may then be translated based on the determined direction.

Figure 4A:
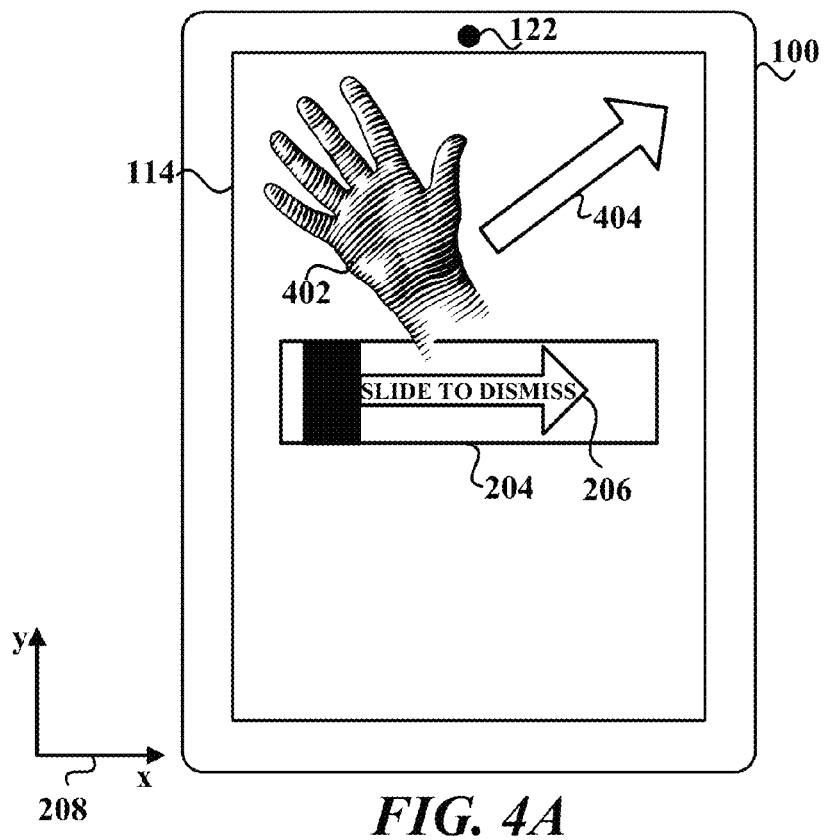
FIGS. 4A and 4B are diagrams illustrating an example of processing a detected gesture based on a translated coordinate system, consistent with some embodiments.
Figure 4B:
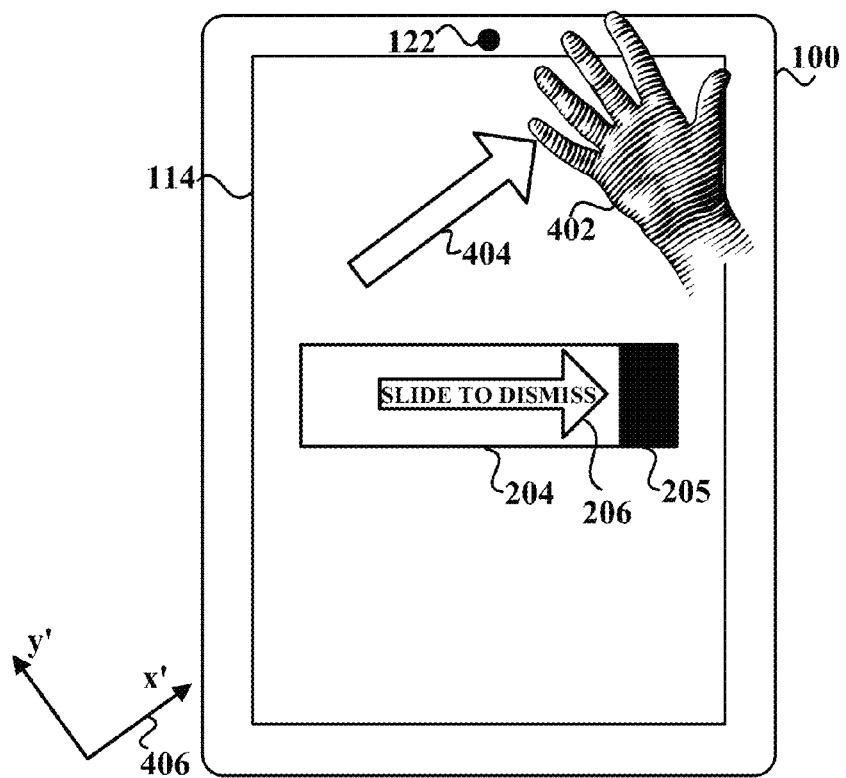

FIGS. 4A and 4B are diagrams illustrating an example of processing a detected gesture based on a translated coordinate system, consistent with some embodiments. As shown in FIG. 4A, processing component 106 may generate a prompt or alert 204 wherein a user may dismiss prompt or alert 204 by sliding bar 205 in a direction 206. Moreover, a user may dismiss prompt or alert 204 by making a touchless gesture of a swipe in direction 206 corresponding to coordinate system 208. A user may not know an orientation of device 100, or may be positioned with respect to device 100 such that it is difficult to make a touchless gesture in direction 206. As a result, a user may pass a control object 402 in direction 404 over device 100. In some embodiments, control object 402 may correspond to a hand of a user, a stylus, a pen, or other object that, when in motion, may be detected by gesture detection sensor 122 and be recognized by processing component 106 as a gesture. Gesture detection sensor 122 may detect the movement of control object 402 over device 100 in direction 404, and processing component 106 may then determine if the movement of control object 402 over device in direction 404 corresponds to a known touchless gesture or an expected touchless gesture.

In some embodiments, processing component 106 may expect a touchless gesture in direction 206 to dismiss prompt or alert 204. In some embodiments, a touchless swipe gesture in direction 206 may be a known touchless gesture corresponding to performing a dismissal command. However, the movement of control object 402 over device 100 in direction 404 may be detected by gesture detection sensor 122 and compared to an expected touchless gesture in direction 206 or a known touchless swipe gesture in direction 206 in a gesture table. Since the detected movement of control object 402 over device 100 in direction 404 may not match either an expected touchless gesture in direction 206 or a known touchless swipe gesture in direction 206 in a gesture table, processing component 106 may not detect a match, and the user may not successfully dismiss alert or prompt 204.

However, as shown in FIG. 4B, processing component 106 may translate coordinate system 208 to a translated coordinate system 406 based on detected direction 404. A subsequent movement of control object 402 in direction 404 may then be detected by gesture detection sensor 122 and compared by processing component 106 to an expected touchless gesture in direction 206 or a known touchless swipe gesture in direction 206 in a gesture table that has been translated to new coordinate system 406 based on direction 404. As a result, movement of control object 402 in direction 404 may be matched by processing component 106 to an expected touchless gesture in direction 206 or a known touchless swipe gesture in direction 206 in a translated gesture table to perform an action, such as dismissing prompt or alert 204. This is illustrated in FIG. 4B, where the movement of control object 402 detected by gesture detection sensor 122 is matched by processing component 106 to an expected touchless gesture in direction 206 or a known touchless swipe gesture in direction 206 in a translated gesture table to slide bar 205, and alert or prompt 204 may thereafter be dismissed.

Although FIGS. 4A and 4B illustrate an example where an initial movement of control object 402 in direction 404 is not matched by processing component 106 to an expected touchless gesture in direction 206 or a known touchless swipe gesture in direction 206 in a gesture table, and processing component 106 subsequently translates coordinate system 208 to new coordinate system 406 for the detection of subsequent gestures, in some embodiments, a user may deliberately move a control object over device 100 in a specific direction to set a coordinate system for subsequent gesture detection. For example, if a user is unaware of the orientation of device 100, user may make a first deliberate movement in direction 404 to translate coordinate system 208 for one or more subsequent gestures to coordinate system 406 based on direction 404. This may be useful if the user is driving and wants to perform actions on device 100 without having to determine an orientation of device. Or if the user has device 100 on a nightstand next to their bed and is attempting to dismiss an alarm generated by device 100 or answer a call and activate speaker mode. The user can make a first motion with a control object to set a coordinate system, and then one or more subsequent gestures may be processed according to the coordinate system set by the user with the first motion.

In some embodiments, direction 404 may be determined by a pose of control object 402. For example, if control object 402 is a hand, such as shown in FIGS. 4A and 4B, a user may pose hand 402 over gesture detection sensor 122 such that gesture detection sensor 122 is able to detect an orientation of hand 402. Since a hand is an object that may have noticeable features in a predetermined arrangement, such as fingers, a thumb, and a palm, processing component 106 may be able to determine an orientation of hand 402 based on the detected pose. Processing component 106 may then be capable of translating coordinate system 208 to coordinate system 406 based on the determined orientation of hand 402. Although hand 402 has been described for purposes of illustration, an orientation of control object 402 may be determined for any control object 402 that has discernible features that may allow for the determination of an orientation of control object 402 based on a detected pose.

Figure 5:
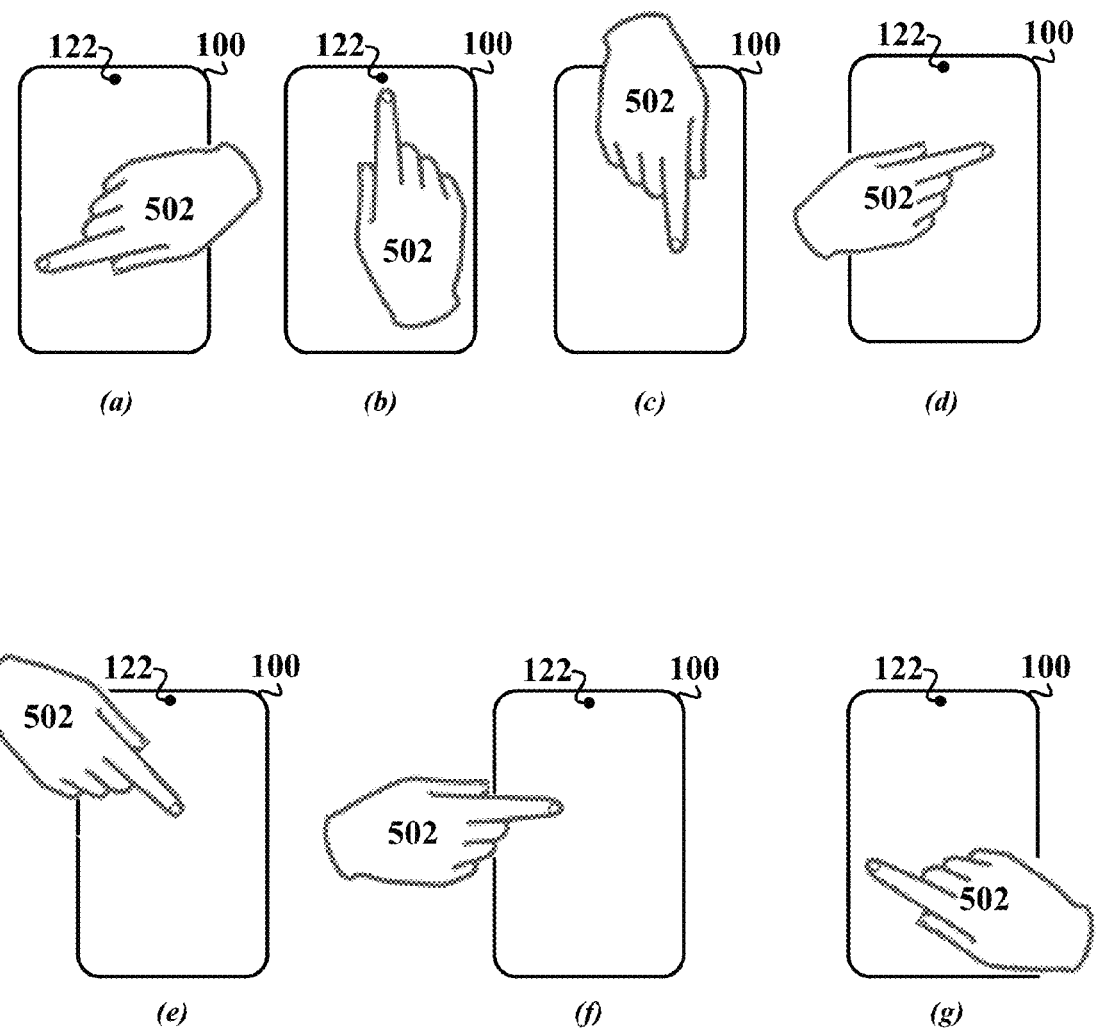
FIG. 5 is a diagram illustrating the same gesture in numerous orientations, consistent with some embodiments.

FIG. 5 is a diagram illustrating the same gesture in numerous orientations, consistent with some embodiments. As shown in FIG. 5, gesture detection sensor 122 of device 100 may be capable of detecting a gesture or pose of a hand 502 of a user and correlating the detected gesture or pose to a command or action. In some embodiments, a gesture lookup table stored in any of memories 108-112 may be capable of correlating the same gesture in many orientations to the same command or action. For example, as shown in FIG. 5, hand 502 is making a gesture, such as a pointing gesture. As also shown in FIG. 5, hand 502 may be oriented in a number of orientations shown in (a)-(g). Consistent with some embodiments, processing component 106 may be configured to interpret the pointing gesture, regardless of orientation, as the same command or action. For example, the pointing gesture may be correlated to a command or action for performing a left-to-right swipe to dismiss alert or prompt 204. Consequently, a user of device may be able to dismiss alert or prompt 204 by making the pointing gesture.

In some embodiments, if the user does not know the orientation of device 100, processing component 106 may be capable of correlating the same gesture in multiple orientations, such as orientations (a)-(g) to a command or action for performing a left-to-right swipe to dismiss alert or prompt 204. In some embodiments, a gesture lookup table stored in any of memories 108-112 may have a table wherein the same gesture in different orientations, such as orientations (a)-(g) are all interpreted as the same action or command, such as performing a left-to-right swipe to dismiss alert or prompt 204. In other embodiments, processing component 106 may be capable of determining the pose of hand 502 based on features of hand 502 detected by gesture detection sensor 122, such as the extended index finger, and correlate the detected pose as the action or command of performing a left-to-right swipe to dismiss alert or prompt 204, independent of the orientation. In other embodiments, processing component 106 may be capable of performing a translation based on the orientation of hand 502 determined from detected features of hand 502, and perform a translation on a gesture lookup table, such as described previously. Further, in some embodiments, processing component 106 may be able to determine a direction of motion based on the orientation of hand 502 determined from detected features of hand. In some embodiments, processing component may compare an initial or detected gesture to each of the gestures 5(a)-5(g), and set or translate a coordinate system for subsequent gestures based on which of the gestures 5(a)-5(g), if any, match the initial or detected gesture.

Figure 6A:
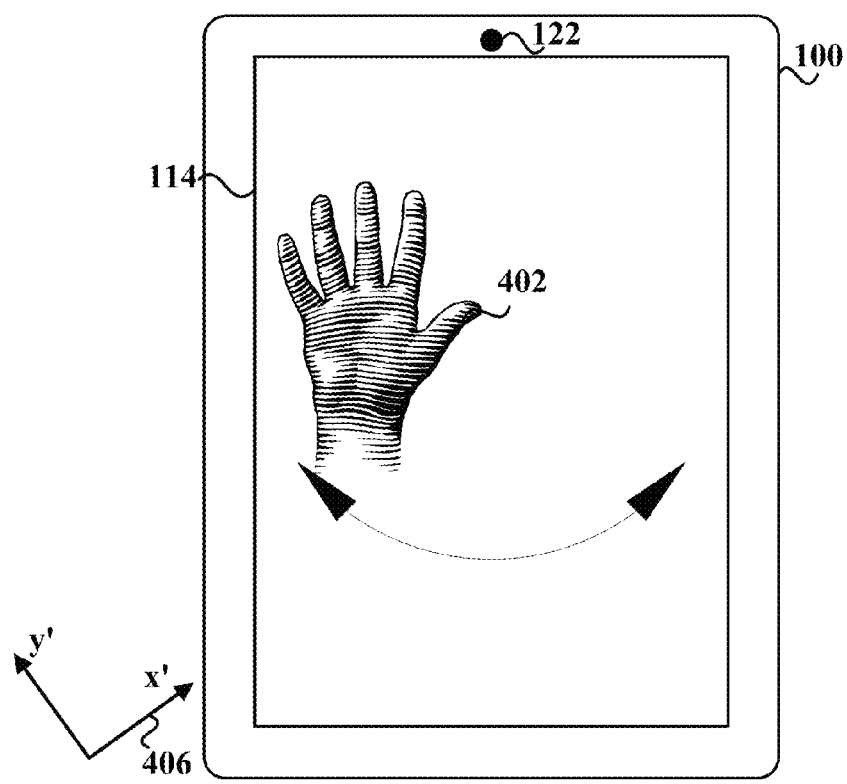
FIGS. 6A and 6B are diagrams illustrating an example of performing a gesture to reset the coordinate system, consistent with some embodiments.
Figure 6B:
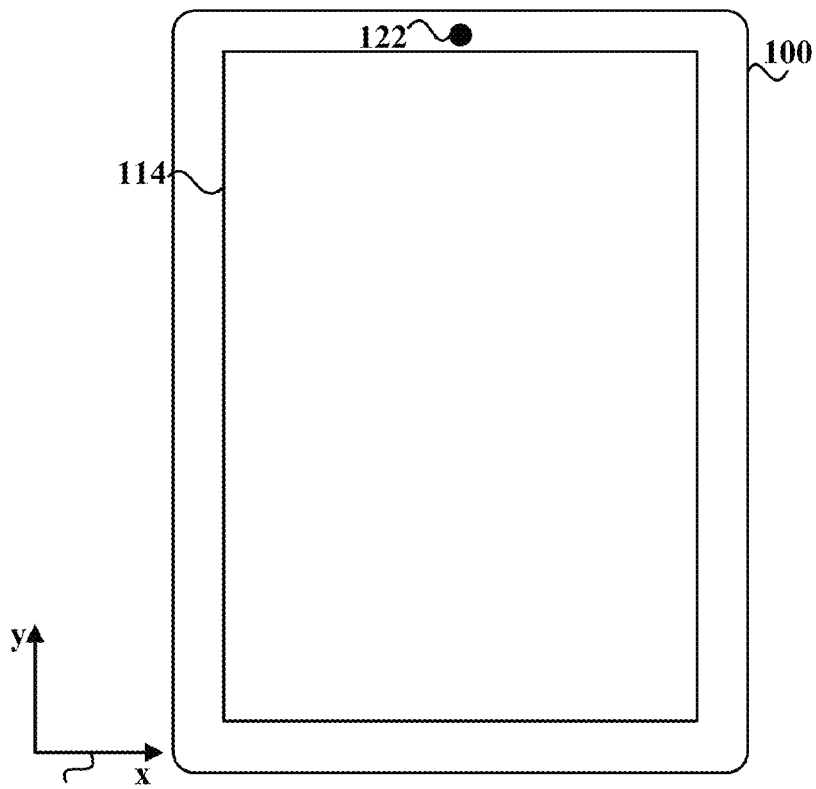

FIGS. 6A and 6B are diagrams illustrating an example of performing a gesture to reset the coordinate system, consistent with some embodiments. As described above, reset conditions may be detected for resetting a translated coordinate system to the original coordinate system, which may be a coordinate system that is aligned with the dimensions of device 100. In some embodiments, memories 108-112 may include a gesture lookup table that includes a gesture or pose for resetting the coordinate system to an original coordinate system or a "normal" coordinate system that is aligned with the dimensions of device 100. In some embodiments, the gesture may be a substantially circular gesture or portion thereof, such as shown in FIG. 6A wherein control object 402, which may be a hand, moves in a substantially circular direction or portion thereof. However, any gesture or pose may be assigned to reset the coordinate system in a gesture lookup table. As shown in FIG. 6B, the coordinate system for detecting gestures and/or poses has been reset to an original coordinate system 208. In some embodiments, such circular gesture or portion thereof may be used to "turn" the coordinate system to another orientation. In some embodiments, such "turning" may occur any time a circular gesture or portion thereof is detected. In other embodiments, such "turning" may occur only if the circular gesture or portion thereof is detected after a reset gesture has been detected.

Figure 7A:
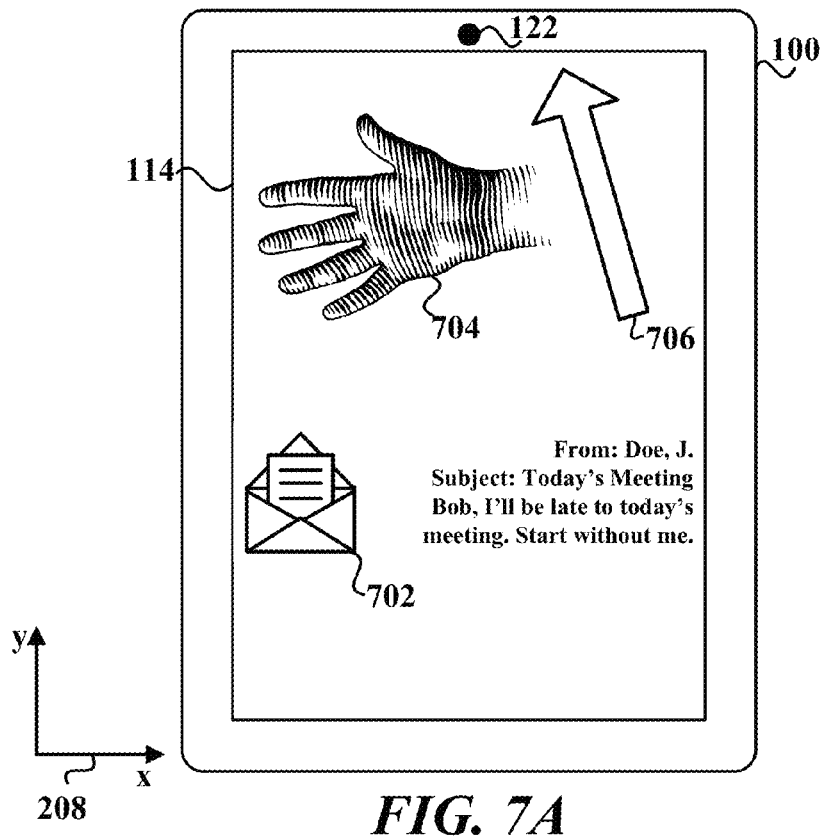
FIGS. 7A and 7B are diagrams illustrating an example of displaying text based on a translated coordinate system, consistent with some embodiments.
Figure 7B:
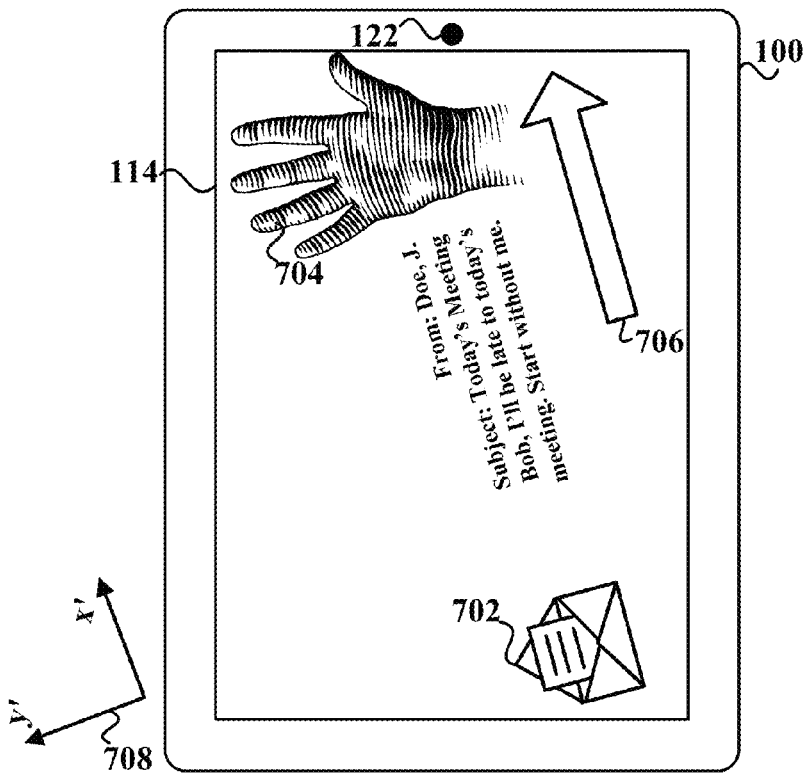

A user may also be able to set a coordinate system by a detected direction of a gesture for other purposes. For example, a user may make a first movement to set a coordinate system for the display of text. FIGS. 7A and 7B are diagrams illustrating an example of displaying text based on a translated coordinate system, consistent with some embodiments. A shown in FIG. 7A, device 100 may display a notification, an alert, or a message such as an-email message 702 on display component 114 in a direction determined by coordinate system 208. If device 100 is at an orientation from a user that makes it difficult for the user to recognize or read the message 702, the user may make a motion with a control object 704 in a direction 706. Gesture detection sensor 122 may detect the motion and processing component 106 may determine a direction of the motion and translate coordinate system 208 based on direction 706. As shown in FIG. 7B, processing component 106 has translated coordinate system 208 to a new coordinate system 708 based on direction 706. A user may then make a motion with control object 704 in direction 706 which may be detected by gesture detection sensor 122 and matched to a known touchless gesture for displaying content displayed on display component 114 in a direction determined by new coordinate system 708. Message 702 may then be displayed on display component 114 in a direction determined by new coordinate system 708. Although FIGS. 7A and 7B illustrate displaying text of a message in a translated coordinate system based on a direction of a detected motion of control object 704 over device 100, videos, graphics, and other features may also be displayed in the translated coordinate system. Further, three dimensional content or holographic content may be presented so as to be properly oriented with respect to a user of device 100 based on the direction 706.

In some embodiments, device may initially provide a visual, haptic, or audio indication that a message has been received. The indication may be a chime, beep, vibration, blinking light or screen, and the like. Message 702 may be displayed only after gesture detection sensor 122 detects motion of hand 704 in some embodiments. The direction of the detected motion may then translate coordinate system 208 to 708, and subsequent gestures may be correlated by processing component as commands or actions to be performed on message 702. Examples of some commands that may be effected in various embodiments include swiping to go to a next or previous message, swiping or moving a control object to scroll or pan, and/or movement of the control object to place a displayed message into a folder or archive or delete the message.

Figure 8:
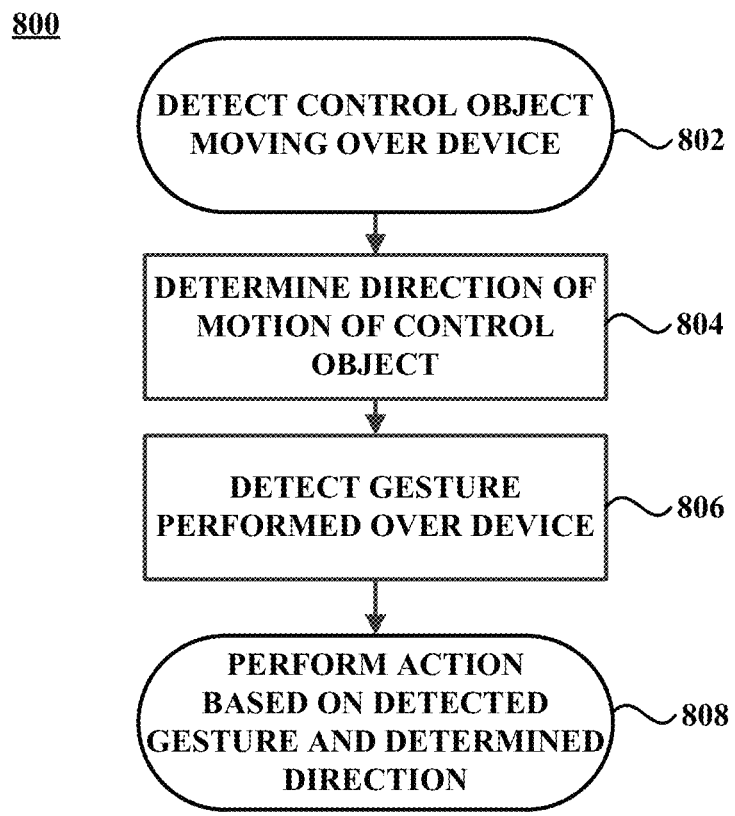
FIG. 8 is a flowchart illustrating a process for performing an action based on a determined direction, consistent with some embodiments.

FIG. 8 is a flowchart illustrating a process for performing an action based on a determined direction, consistent with some embodiments. For the purpose of illustration, FIG. 8 will be described with reference to any of FIGS. 1, 2, 3A-3B, 4A-4B, 5, 6A-6B, and 7A-7B. The process 800 shown in FIG. 8 may be embodied in computer-readable instructions for execution by one or more processors in processing component 106 of device 100. In some embodiments, process 800 may be implemented by an operating system of device 100 stored in any of memories 108-112 and executed by processing component 106. In some embodiments, process 800 may be implemented as a background service in the operating system. As shown in FIG. 8, process 800 begins when a control object is detected moving over device (802). In some embodiments, gesture detection sensor 122 may detect a control object, such as control object 202 or 402 moving over device 100 in a direction, such as direction 302 or 404. In some embodiments, control object may correspond to a hand of a user, a stylus handled by the user, or other object that user may be able to move in a direction. As described above, gesture detection sensor 122 may capture frames of data representative of the control object as it moves along a path for processing by processing component 106. Processing component 106 may then determine a direction of motion of the control object (804). In some embodiments, processing component 106 may analyze captured frames of data to determine a direction of the control object based on a path from an initial gesture point $(x_i, y_i)$ to a final gesture point $(x_f, y_f)$. In some embodiments, 802 and 804 may not be separate, but may be included in a single step, wherein the direction is known from the detected gesture. For example, using a gesture detection table such as shown in FIG. 5, processing component 106 may be able to determine the coordinate system based on the orientation of hand 502 and, thus, the coordinate system may be determined based on the detected hand pose. Alternatively, if a histogram is used for gesture detection, analysis of the histogram may yield that a gesture was performed and the direction of the gesture.

Process 800 may then detect a gesture performed over device (806). In some embodiments, the gesture may be made by the same control object that moved over the device. In some embodiments, the control object may correspond to a hand of a user, a stylus handled by the user, or other object that user may be able to move to make a gesture. The gesture may be detected by gesture detection sensor 122 for processing by processing component 106. In some embodiments, the gesture may be detected by a different sensor than the sensor that detects the control object moving over device 100. For example, gesture detection sensor 122 may include one or more sensors that may each detect motion and/or direction independently. Moreover, proximity sensor 124 may be capable of detecting the control object moving over the device and gesture detection sensor 122 may detect the gesture performed over the device. Further, each of the motion over the device and/or the detected gesture may be performed by a combination of sensors. Processing component 106 may then perform an action based on the detected gesture and the determined direction (808). In some embodiments, processing component 106 may translate coordinate system 208 of device 100 to a translated coordinate system, such as systems 304 or 408, based on the determined direction such that known touchless gestures in a gesture library or an expected touchless gesture are translated to the translated coordinate system. Processing component 106 may then match the detected touchless gesture to a translated known touchless gesture in a translated gesture library or a translated expected touchless gesture and perform an action based on the matching translated touchless gesture. In some embodiments, processing component 106 may process subsequent touchless gestures based on the translated coordinate system for a predetermined period of time, after which processing component 106 may process detected gestures according to original coordinate system 208.

In some embodiments, the detected touchless gesture may be a hand pose, wherein the hand pose corresponds to a specific action defined in a gesture lookup table, such as described in FIG. 5, and determining a coordinate system and detecting a second gesture is not necessary for performing the action; the action corresponding to the detected hand pose gesture may be detected independent of the orientation of the hand pose. In some embodiments, processing component 106 may process subsequent touchless gestures based on the translated coordinate system for a predetermined period of time, after which processing component 106 may process detected gestures according to original coordinate system 208. Alternatively, processing component 106 may return to processing subsequent gestures in original coordinate system 208 based on conduct by a user, or a movement of device detected by accelerometer of 118 that may be indicative of a change in an orientation of device 100, or after expiration of a timeout following a last detected gesture.

Process 800 may be used for dismissing a prompt or alert 204, as shown in FIGS. 2A, 2B, 3A, 3B, 4A and 4B, and discussed therein. In some embodiments, process 800 may also be used for performing other actions. For example, a user could move a control object over device 100 (802) in a specific direction (804) that may activate an application that displays pages, such as a reader application. Subsequent detected gestures (806) may then be detected that may be correlated to an action for turning pages within the reader application (808). Alternatively, if a user is using a music application, the user could move a control object over device 100 (802) in a specific direction (804) to display albums, album covers, or track listings. These features may also be displayed in the specific direction. Moreover, subsequent gestures made by the user may be detected (806) that may be correlated to an action for flipping through the albums, moving between tracks, etc.

Figure 9:
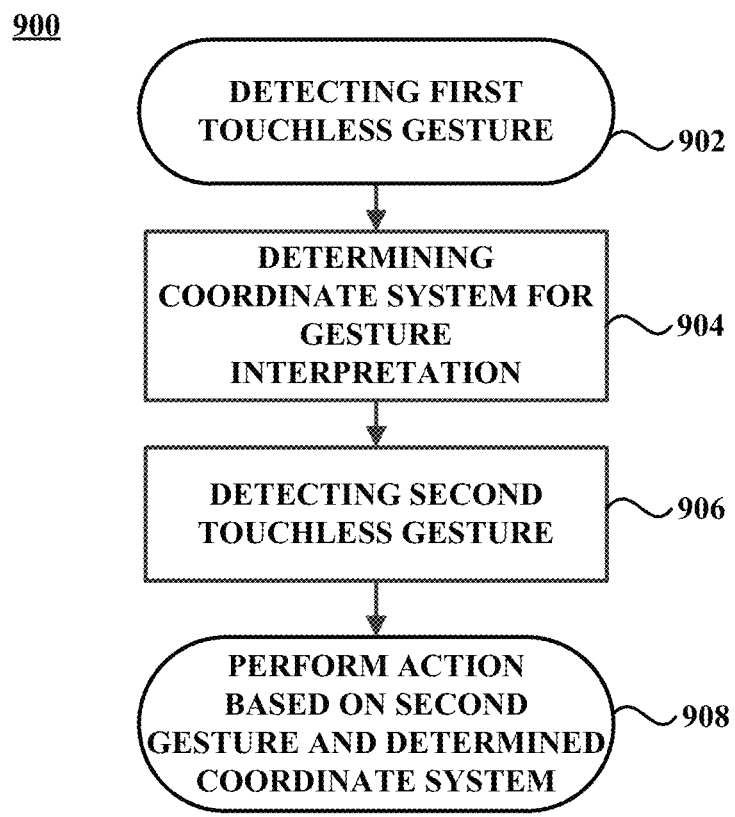
FIG. 9 is a flowchart illustrating a process for performing an action based on a determined coordinate system, consistent with some embodiments.

FIG. 9 is a flowchart illustrating a process for performing an action based on a determined coordinate system, consistent with some embodiments. For the purpose of illustration, FIG. 9 will be described with reference to any of FIGS. 1, 2, 3A-3B, 4A-4B, 5, 6A-6B, and 7A-7B. The process 900 shown in FIG. 9 may be embodied in computer-readable instructions for execution by one or more processors in processing component 106 of device 100. In some embodiments, process 900 may be implemented by an operating system of device 100 stored in any of memories 108-112 and executed by processing component 106. In some embodiments, process 900 may be implemented as a background service in the operating system. As shown in FIG. 9, process 900 begins when a first touchless gesture is detected near a device (902). In some embodiments, gesture detection sensor 122 may detect a control object, such as control object 202 or 402 performing a gesture near device 100 in a direction, such as direction 302 or 404. In some embodiments, the control object may correspond to a hand of a user, a stylus handled by the user, or other object that the user may be able to gesture in a direction. The gesture may be a hand pose, and the direction may correspond to an orientation of the pose of hand 502. As described above, gesture detection sensor 122 may capture frames of data representative of the control object making the gesture for processing by processing component 106. Processing component 106 may then determine a coordinate system for gesture interpretation based on the detected first touchless gesture (904). In some embodiments, the coordinate system may be determined by determining an alignment and/or an orientation of the coordinate system from the direction of the control object. In some embodiments, processing component 106 may analyze captured frames of data to determine a direction of the control object based on a path from an initial gesture point $(x_i, y_i)$ to a final gesture point $(x_f, y_f)$. In some embodiments, 902 and 904 may not be separate, but may be included in a single step, wherein the direction is known from the detected gesture. For example, using a gesture detection table such as shown in FIG. 5, processing component may be able to determine the coordinate system based on the orientation of hand 502 and, thus, the coordinate system may be determined based on the detected hand pose. Alternatively, if a histogram is used to for gesture detection, analysis of the histogram may yield that a gesture was performed and the direction of the gesture. The gesture detected at 902 may be, for example, a swipe, a hand pose, an "L" shape, and arrow or pointed bracket, or other gesture in different embodiments. A specific gesture or set of gestures may be detected and/or expected at 902 in some embodiments.

Returning to FIG. 9, process 900 may then detect a second touchless gesture performed near device 100 (906). In some embodiments, the gesture may be made by the same control object that moved near the device. In some embodiments, the control object may correspond to a hand of a user, a stylus handled by the user, or other object that user may be able to move to make a gesture. The gesture may be detected by gesture detection sensor 122 for processing by processing component 106. In some embodiments, the gesture may be detected by a different sensor than the sensor that detects the gesture at 902. For example, gesture detection sensor 122 may include one or more sensors that may each detect motion and/or direction independently. Moreover, proximity sensor 124 may be capable of detecting the gesture at 902. Processing component 106 may then perform an action based on the detected second gesture and the determined coordinate system (908). In some embodiments, processing component 106 may translate coordinate system 208 of device 100 to a translated coordinate system, such as systems 304 or 408, based on the determined direction such that known touchless gestures in a gesture library or an expected touchless gesture are translated to the translated coordinate system. Processing component 106 may then match the detected touchless gesture to a translated known touchless gesture in a translated gesture library or a translated expected touchless gesture and perform an action based on the matching translated touchless gesture.

In some embodiments, the detected touchless gesture may be a hand pose, wherein the hand pose corresponds to a specific action defined in a gesture lookup tables, such as described in FIG. 5, and determining a coordinate system and detecting a second gesture is not necessary for performing the action; the action corresponding to the detected hand pose gesture may be detected independent of the orientation of the hand pose. In some embodiments, processing component 106 may process subsequent touchless gestures based on the translated coordinate system for a predetermined period of time, after which processing component 106 may process detected gestures according to original coordinate system 208. Alternatively, processing component 106 may return to processing subsequent gestures in original coordinate system 208 based on conduct by a user, or a movement of device detected by accelerometer of 118 that may be indicative of a change in an orientation of device 100, or expiration of a timeout following a last detected gesture, for example.

Figure 10:
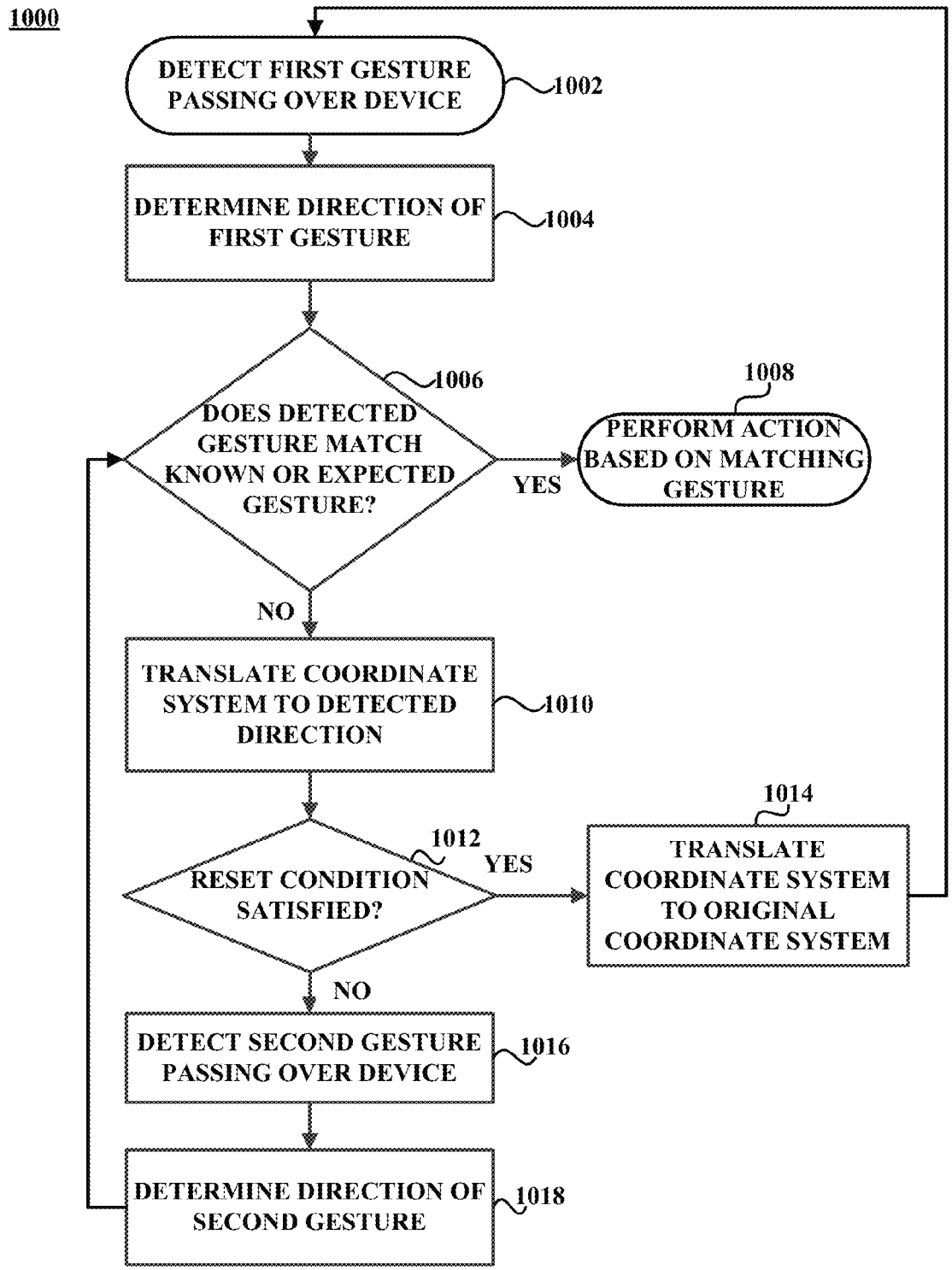
FIG. 10 is a flowchart illustrating a process for performing an action based on a detected touchless gesture, consistent with some embodiments.

FIG. 10 is a flowchart illustrating a process for performing an action based on a detected touchless gesture, consistent with some embodiments. For the purpose of illustration, FIG. 10 will be described with reference to any of FIGS. 1, 2, 3A-3B, 4A-4B, 5, 6A-6B, and 7A-7B. The process 1000 shown in FIG. 10 may be embodied in computer-readable instructions for execution by one or more processors in processing component 106 of device 100. In some embodiments, process 1000 may be implemented by an operating system of device 100 stored in any of memories 108-112 and executed by processing component 106. In some embodiments, process 1000 may be implemented as a background service in the operating system. As shown in FIG. 10, process 1000 may begin when a first gesture passing over device 100 is detected by gesture detection sensor 122 (1002). In some embodiments, the gesture may be made by a user using a control object, that may correspond to a hand of a user, a stylus handled by the user, or other object that user may be able to move. As described above, gesture detection sensor 122 may capture frames of data representative of the control object as it moves along a path for processing by processing component 106. Processing component 106 may then determine a direction of the first gesture (1004). In some embodiments, processing component 106 may analyze captured frames of data to determine a direction of the gesture based on a path from an initial gesture point $(x_i, y_i)$ to a final gesture point $(x_f, y_f)$.

Processing component 106 may then attempt to match the detected gesture to a known touchless gesture or an expected touchless gesture (1006). In some embodiments, processing component may analyze the frames of data captured by gesture detection sensor 122 to determine the touchless gesture made by the user and then attempt to match the detected touchless gesture to a known touchless gesture in a gesture library stored in any of memories 108-112, or an expected touchless gesture. If processing component 106 matches the detected touchless gesture to a known or expected touchless gesture, processing component 106 may perform an action based on the matching touchless gesture (1008). If a match is not made, processing component 106 may then translate a coordinate system of device 100 and known touchless gestures in a gesture library or an expected gesture to a new coordinate system based on the detected direction of the first touchless gesture (1010).

Processing component 106 may then make a determination whether a reset condition has been satisfied (1012). In some embodiments, a reset condition may be a condition that, when met, resets the translated coordinate system back to the original coordinate system by transforming the coordinate system back to original coordinate system 208. A reset condition may include gesture detection sensor 122 not detecting a second or subsequent gesture after a predetermined time t. A reset condition may include accelerometer of 118 detecting a movement of device 100 that may be indicative of an orientation of device 100 being changed or a user picking up device 100. A reset condition may include a user manually translating the coordinate system to the original coordinate system by pressing a button on device, or changing a setting in device 100. If a reset condition is satisfied, processing component 106 may translate the coordinate system back to the original coordinate system 208 (1014), which may remain the coordinate system for processing detected gestures until another detected touchless gesture does not match a known or expected gesture. If a reset condition is not satisfied, processing component 106 may process subsequent touchless gestures according to the translated coordinate system.

Gesture detection sensor 122 may detect a second touchless gesture passing over device (1016). Processing component 106 may then determine a direction of the second touchless gesture (1018). In some embodiments, processing component 106 may analyze captured frames of data to determine a direction of the second touchless gesture based on a path from an initial gesture point to a final gesture point. Processing component 106 may then attempt to match the detected touchless gesture to a known touchless gesture or an expected touchless gesture based on the translated coordinate system (1006) and perform an action based on a matching touchless gesture according to the translated coordinate system (1008). Processing component 106 may further perform 1008-1018 until an action is performed based on a matching gesture or no further gestures are detected.

Software, in accordance with the present disclosure, such as program code and/or data, may be stored on one or more machine readable mediums, including non-transitory machine readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide systems and methods for performing a device action based on a detected gesture independent of an orientation of a device. In particular, embodiments as described herein may translate a coordinate system associated with a device based on an first touchless gesture or movement, and then process one or more subsequent touchless gestures according to the translated coordinate system. As a result, a user may be able to perform a behavior or movement or touchless command independent of the device orientation by setting a new orientation with a first touchless gesture. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A method for performing an action, comprising:
 detecting, by a first gesture detection sensor coupled to or integrated in a device, motion of a control object moving over the device;
 determining, by one or more processors of the device, a direction of movement of the control object;
 translating a coordinate system related to the device based on the determined direction of movement;
 translating an expected gesture to the translated coordinate system;
 detecting, by a second gesture detection sensor, a touchless gesture performed over the device;
 matching the detected touchless gesture to the translated expected gesture; and
 performing, by one or more processors, an action based on the matching.

2. The method of claim 1, wherein translating a coordinate system comprises translating a gesture library based on the determined direction of movement.

3. The method of claim 2, wherein performing an action comprises: matching the touchless gesture to a translated gesture in the translated gesture library; and performing an action corresponding to the matching translated gesture.

4. The method of claim 1, wherein detecting movement of a control object moving over the device comprises capturing images, with the first gesture detection sensor, of the control object as it moves over the device.

5. The method of claim 4, wherein determining a direction of movement of the control object comprises:
 dividing each captured image into a set of sub-regions, calculating a region statistic for each sub-region;
 determining a displacement between region statistics of a current image and one or more previous images; and
 determining the direction of movement of the control object based on the determined displacement.

6. The method of claim 1, wherein the control object performs the touchless gesture.

7. The method of claim 6, wherein the control object comprises a hand of a user.

8. The method of claim 1, wherein the first gesture detection sensor or the second gesture detection sensor comprises at least one of a camera, an ultrasound sensor, an infrared sensor, and a shadow detector.

9. The method of claim 1, wherein the first gesture detection sensor comprises the second gesture detection sensor.

10. The method of claim 1, wherein performing an action comprises displaying content aligned with the determined direction on the device.

11. A device for performing an action, comprising:
 a gesture detection sensor configured to:
 detect movement of a control object moving over the device and capture information related to the detected movement; and
 detect a touchless gesture performed over the device and capture information related to the touchless gesture;
 one or more processors configured to:
 determine a direction of motion of the control object from the captured information related to the detected movement;

translate a coordinate system related to gesture interpretation for the device based on the determined direction of motion;

translate an expected gesture to the translated coordinate system;

match the captured information related to the touchless gesture to the translated expected gesture; and perform an action based on the matching.

12. The device of claim 11, wherein the one or more processors are further configured to translate a gesture library to the translated coordinate system.

13. The device of claim 12, wherein the one or more processors are further configured to match the captured information related to the touchless gesture to a translated gesture in the translated gesture library and perform an action corresponding to the matching translated gesture.

14. The device of claim 11, wherein the gesture detection sensor is configured to capture images, wherein the one or more processors are configured to determine the direction of motion of the control object by determining a displacement of a region statistic between regions of a current image from the gesture detection sensor and one or more previous images from the gesture detection sensor.

15. The device of claim 11, wherein the control object performs the touchless gesture.

16. The device of claim 15, wherein the control object comprises a hand of a user.

17. The device of claim 11, wherein the gesture detection sensor comprises at least one of a camera, an ultrasound sensor, an infrared sensor, and a shadow detector.

18. The device of claim 11, wherein the performed action comprises displaying content on the device, the content being aligned with the determined direction.

19. A system for performing an action, comprising:
means for detecting movement of a control object moving over a device;
means for determining a direction of movement of the control object;
means for translating a coordinate system related to the device based on the determined direction of movement;
means for translating the touchless gesture based on the translated coordinate system;
means for detecting a touchless gesture performed over the device;
means for matching the translated touchless gesture to an expected gesture; and
means for performing an action based on the matching.

20. The system of claim 19, wherein the means for translating a coordinate system is configured to translate a gesture library based on the determined direction of movement.

21. The system of claim 20, further comprising:
means for matching the touchless gesture to a translated gesture in the translated gesture library, wherein the means for performing an action is configured to perform an action corresponding to a matching translated gesture.

22. The system of claim 19, wherein the translated coordinate system is oriented differently than the coordinate system was oriented prior to detecting the movement of the control object.

23. The system of claim 19, wherein the control object performs the touchless gesture, and wherein the control object comprises a hand of a user.

24. The system of claim 23, wherein the means for determining the direction of movement of the control object is configured to detect one or more features on the hand and determine the direction based on the detected one or more features.

25. The system of claim 19, wherein:
the means for detecting movement of a control object moving over the device is configured to capture images of the control object as it moves over the device; and the means for determining a direction of movement of the control object comprises:
means for dividing each captured image into a set of sub-regions,
means for calculating a region statistic for each sub-region;
means for determining a displacement between region statistics of a current image and one or more previous images; and
means for determining the direction of movement of the control object based on the determined displacement.

26. The system of claim 19, wherein the means for detecting movement of a control object moving over the device and the means for detecting a touchless gesture performed over the device comprises at least one of a camera, an ultrasound sensor, an infrared sensor, and a shadow detector.

27. The system of claim 19, further comprising means for causing content to be displayed in response to the detected movement of the control object, wherein the means for performing the action comprises means for manipulating the displayed content.

28. The system of claim 19, wherein the means for performing an action is configured to display content on the device such that the content is aligned with the determined direction.

29. A computer-readable medium including instructions that, when executed by one or more processors of a device, cause the device to perform a method for performing an action, the method comprising:
detecting motion of a control object moving over the device;
determine a direction of movement of the control object;
translate a coordinate system related to the device based on the determined direction of movement;
translate the touchless gesture based on the translated coordinate system;
detecting a touchless gesture performed over the device;
match the translated touchless gesture to an expected gesture; and
performing an action based on the detected touchless gesture and a direction of the motion.

* * * * *